United States Patent
Abraham

(10) Patent No.: US 9,766,348 B2
(45) Date of Patent: Sep. 19, 2017

(54) GNSS ARCHITECTURE

(71) Applicant: AVAGO TECHNOLOGIES GENERAL IP (SINGAPORE) PTE. LTD., Singapore (SG)

(72) Inventor: Charlie Abraham, Los Gatos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/018,234

(22) Filed: Feb. 8, 2016

(65) Prior Publication Data

US 2016/0154115 A1 Jun. 2, 2016

Related U.S. Application Data

(63) Continuation of application No. 13/311,980, filed on Dec. 6, 2011, now Pat. No. 9,274,229.

(51) Int. Cl.
| | |
|---|---|
| *G01S 19/40* | (2010.01) |
| *G01S 19/37* | (2010.01) |
| *G01S 19/34* | (2010.01) |
| *G01S 19/03* | (2010.01) |
| *G01S 19/09* | (2010.01) |

(52) U.S. Cl.
CPC ............ *G01S 19/37* (2013.01); *G01S 19/34* (2013.01); *G01S 19/03* (2013.01); *G01S 19/09* (2013.01)

(58) Field of Classification Search
CPC .......... G01S 19/34; G01S 19/37; G01S 19/01; G01S 19/03; G01S 19/09
USPC ............ 342/357.23, 357.25, 357.74, 357.75, 342/357.46
See application file for complete search history.

(56) References Cited

U.S. PATENT DOCUMENTS

| | | | |
|---|---|---|---|
| 7,546,395 B2 | 6/2009 | Yamamoto | |
| 7,679,557 B2 * | 3/2010 | Pande | G01S 19/09 342/357.76 |
| 7,813,875 B2 | 10/2010 | Yamamoto et al. | |
| 8,024,588 B2 | 9/2011 | Cheng et al. | |
| 8,059,699 B2 | 11/2011 | Yeh et al. | |
| 8,184,049 B2 | 5/2012 | Walley et al. | |
| 8,462,046 B2 * | 6/2013 | Syrjarinne | G01S 5/0018 342/357.74 |

(Continued)

FOREIGN PATENT DOCUMENTS

| | | |
|---|---|---|
| CN | 1947029 A | 4/2007 |
| KR | 10-2006-0111519 | 10/2006 |

(Continued)

OTHER PUBLICATIONS

Chinese Office Action issued Apr. 3, 2014, in Chinese Application No. 201210366068.2.

(Continued)

*Primary Examiner* — Chuong P Nguyen
(74) *Attorney, Agent, or Firm* — Oblon, McClelland, Maier & Neustadt, L.L.P.

(57) ABSTRACT

Disclosed are various embodiments of Global Navigation Satellite System (GNSS) chipsets or architecture. Based upon a requested accuracy and/or update of a host application, embodiments of the disclosure can calculate position data points on-board the GNSS chipset or allow a host processor to calculate position data points, which can allow the host processor to enter a low power mode if the requested update rate and/or accuracy allow.

20 Claims, 5 Drawing Sheets

(56) References Cited

U.S. PATENT DOCUMENTS

| | | | |
|---|---|---|---|
| 8,531,333 B2* | 9/2013 | Leclercq | G01S 19/34 342/357.46 |
| 8,964,812 B2* | 2/2015 | Eade | G01S 19/24 375/147 |
| 2003/0107514 A1* | 6/2003 | Syrjarinne | G01S 5/0205 342/357.74 |
| 2003/0234739 A1 | 12/2003 | Orler et al. | |
| 2005/0083230 A1* | 4/2005 | Harvey | G01S 19/34 342/357.74 |
| 2005/0104774 A1 | 5/2005 | Pande | |
| 2005/0195105 A1* | 9/2005 | McBurney | G01S 19/03 342/357.62 |
| 2009/0040102 A1 | 2/2009 | Herrero et al. | |
| 2009/0106535 A1 | 4/2009 | Chen et al. | |
| 2009/0278738 A1 | 11/2009 | Gopinath | |
| 2009/0315767 A1 | 12/2009 | Scalisi et al. | |
| 2010/0302097 A1* | 12/2010 | Nagahara | G01S 19/22 342/357.25 |
| 2011/0018761 A1 | 1/2011 | Walley et al. | |

FOREIGN PATENT DOCUMENTS

| | | | |
|---|---|---|---|
| WO | 00/49737 | 8/2000 | |
| WO | WO-2010/037416 A1 * | 4/2010 | ............... G01S 5/14 |

OTHER PUBLICATIONS

Chinese Office Action issued Nov. 24, 2014, in Chinese Application No. 201210366068.2 (3 pages).

Lachapell, Gerard. "GNSS Solution." Inside GNSS. Jun. 2007. Accessed Nov. 17, 2014 http://www.insidegnss.com/node/267.

Tisserand, Arnaud. "Introduction to Power Consumption in Digital Integrated Circuits." Apr. 2010. Accessed Nov. 17, 2014. http://ecofac2010.irisa.fr/cours-tisserand.pdf.

Korean Office Action in co-pending, related Korean Application No. 10-2012-0107819, mailed Nov. 22, 2013.

European Search Report in co-pending, related EP Application No. 12005866.4, mailed Jan. 4, 2013.

* cited by examiner

GNSS ARCHITECTURE

CROSS REFERENCE TO RELATED APPLICATION

This application is a continuation of and is based upon and claims benefit of priority under 35 U.S.C. §120 for U.S. Ser. No. 13/311,980, filed Dec. 6, 2011, which is hereby incorporated by reference in its entirety.

BACKGROUND

Global Navigation Satellite System (GNSS) chipsets and/or modules are often found within various types of devices. For example, many smartphone and other mobile devices incorporate a GNSS chipset that provides the ability for the smartphone to execute location based applications, which can take advantage of detection of a geographical location by the GNSS chipset accessible to the smartphone. A navigation device providing turn by turn directions that are rendered on a display device also employs detection of a location by a GNSS chipset. Power consumption of a mobile device can strain resources of a mobile device when a GNSS chipset is activated for purposes of location detection.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
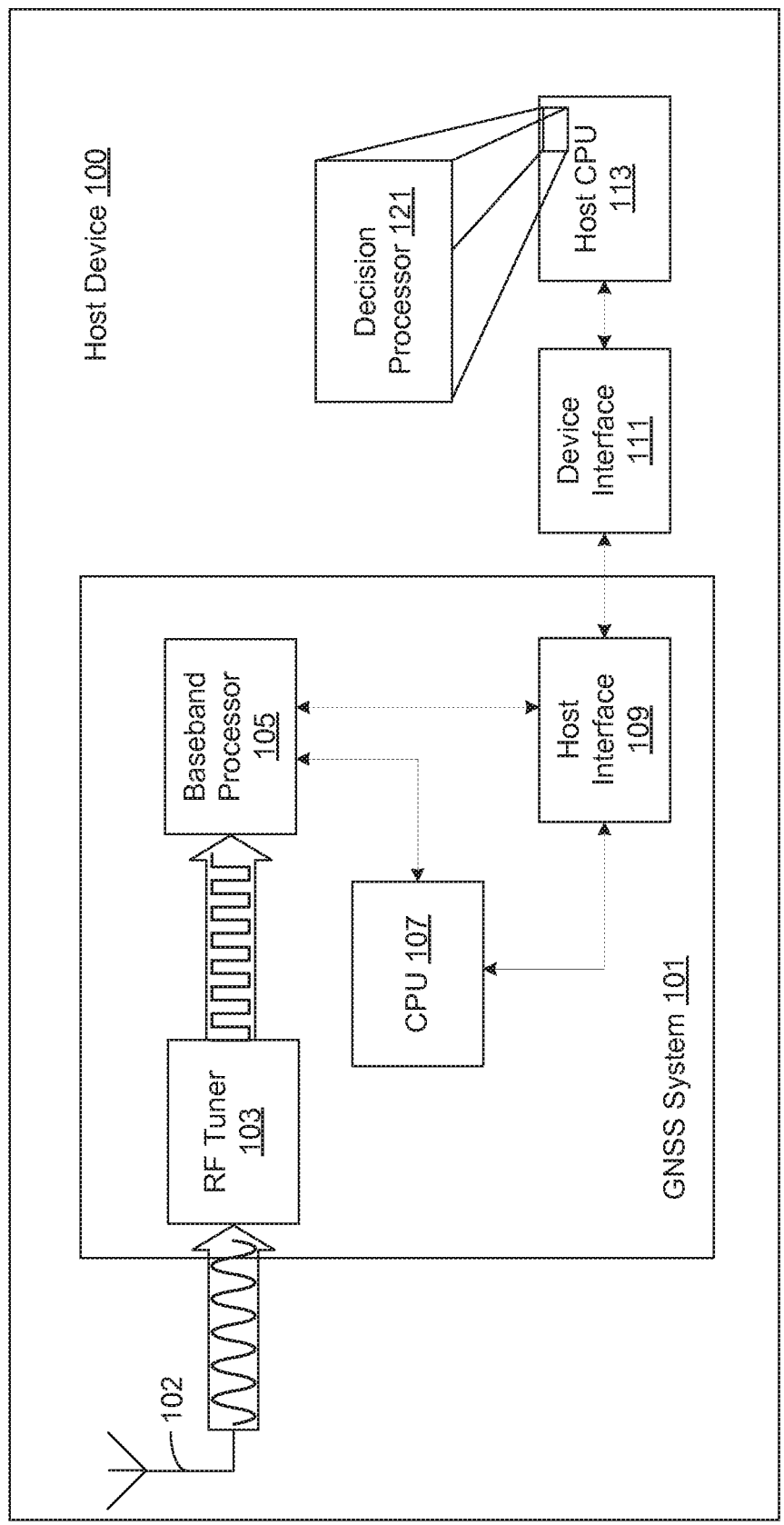
FIG. 1 is a drawing of Global Navigation Satellite System (GNSS) system incorporated into a host device according to various embodiments of the disclosure.

Mobile devices often include a Global Navigation Satellite System (GNSS) chipset or module that provides location detection abilities. A GNSS chipset can receive signals from a global and/or regional satellite network and employ various calculations on the received signals to determine a geographical location of the chipset and a device in which the chipset is integrated. GNSS chipsets can receive signals that are broadcasted from various types of satellite networks, which in some cases can also include ground based repeaters or transmitters that facilitate location detection by a GNSS device. These satellite networks can include, but are not limited to Global Position System (GPS), GLONASS, Galileo positioning system, and other types of location finding systems as can be appreciated.

Some mobile devices in which a GNSS chipset is integrated employ a system-on-a-chip (SoC) GNSS chipset architecture. In such a solution, the entire GNSS system is integrated within a single chipset or module that is integrated in the mobile device. In other words, a SoC GNSS chipset includes various hardware components that compute a requested location at a particular precision and update rate as requested by a host device in which the chipset is integrated. In one example, the output of such a GNSS solution is position, velocity, and time that is calculated by the SoC GNSS chipset from signal measurements associated associated with demodulated signals received from one or more satellites and/or ground based signal transmitters. For example, an SoC chipset can include a radio frequency tuner(s), baseband processor(s), and one or more central processing units (CPUs) in which a position data point is calculated that expresses a location based upon the signals received in the RF tuner(s).

A SoC GNSS chipset can provide position data points according to an update frequency and/or a precision parameter that is provided by a host system. In other words, a host CPU in a mobile device executing software on the mobile device can request position data from a SoC GNSS chipset, which can respond to the host CPU with position data points (e.g., position, velocity, and/or time) based upon the signals received in the chipset. Accordingly, a host CPU, for example, can execute a navigation and/or geofencing application or process that requires location information. The systems in the SoC GNSS chipset, including the RF tuner, baseband processor(s), and CPU, are activated upon receiving such a request and calculate the requested position data. In other words, the RF tuner, baseband processor, and/or CPU of the SoC chipset are activated in order to provide the requested position data points for the application executed by the host CPU.

Accordingly, in many mobile device architectures that employ a SoC GNSS chipset, the various components in the SoC chipset as well as the host CPU are active during execution of a location application. This situation exists because the host CPU executes a location application, which relies on position data points that are calculated by the CPU of the SoC GNSS chipset. Therefore, in such a situation, the host CPU as well as the CPU in the SoC GNSS chipset are consuming power and potentially draining power resources (e.g., battery) of a mobile device in which they are integrated.

Another GNSS chipset architecture that can be employed in a mobile device or other types of devices is known as a GNSS host based architecture. A host based architecture allows for a less expensive and potentially smaller GNSS chipset to be integrated in a mobile device architecture, as such an architecture relies on a host CPU in a host device to compute a navigation solution, or position data points, from signal measurements received by an RF subsystem and that are processed by a baseband processor. In one embodiment, the baseband processor includes the ability to perform certain control logic functions that are present in a SoC GNSS CPU but does not calculate a complete location solution. In other words, the output of the baseband processor can be certain intermediate data, such as raw correlation energy results, that are based upon the signals received in the RF tuner, which are transmitted to a host CPU in a host device. Accordingly, the host CPU can convert the intermediate data to position data points. In many cases, a software library including an application programming interface is provided by a GNSS chipset vendor that allows the host CPU to make such a conversion.

Because a host based architecture does not include an on-board CPU that calculates position data points and instead relies on the host CPU to perform such calculations, a smaller GNSS chipset is realized. However, location applications executed by the host CPU on behalf of a host device require the host CPU to be powered in order to track a location of the host device and calculate position data from intermediate data received from the host based GNSS chipset. Accordingly, power consumption is also a concern in traditional host based architectures.

Therefore, embodiments of the disclosure are generally related to a GNSS module or chipset that can include multiple modes that can reduce power consumption in a device depending upon a type of location application requested by a host device in which it is integrated. Generally speaking, location applications that require frequent position update rates and/or a high degree of position precision or accuracy can be serviced by a GNSS chipset according to an embodiment of the disclosure that effectively mirrors a host based architecture. Location applications that require less frequent position update rates and/or a lower degree of position precision or accuracy can be serviced by an embodiment of the disclosure that calculates position data points with a CPU that is on-board the GNSS chipset. However, in such a scenario, the CPU can be one that consumes far less power than the host CPU and also allows the host CPU to enter a sleep and/or an underclocked state in certain situations, which allows the mobile device to consume less power because the host CPU need not calculate position data points.

Therefore, reference is now made to FIG. 1, which illustrates one embodiment of a GNSS system 101 according to the present disclosure. It should be appreciated that the depicted examples in the accompanying figures represent but one example and that other variations consistent with the disclosure should be appreciated by a person of ordinary skill in the art. The GNSS system 101 shown in FIG. 1 can comprise one or more integrated circuits. The GNSS system 101 is coupled to at least one RF antenna system 102 that can receive signals from one or more satellites and/or ground-based transmitters in a global navigation satellite system. The RF antenna system 101 can be provided as a part of a host device 100 architecture and/or the GNSS system 101. A host device 100 can include a mobile device, such as a smartphone, tablet computing device, navigation device, personal computing device, a device that execution an application in which a location of the device is relevant or any other devices incorporating a GNSS system or chipset as can be appreciated. In many implementations, the GNSS system 101 will rely on an RF antenna system provided by a mobile device in which the GNSS system 101 is integrated to receive one or more signals from a GNSS satellite or other transmitter.

Analog or RF signals that are received by the RF antenna system 101 are extracted by an RF tuner 103 in the GNSS system 101. The RF tuner 103 can convert the RF signals received by the RF antenna system 101 into a digital signal that can be provided to and subsequently processed by the baseband processor 105. As with SoC and traditional host based architectures, the baseband processor 105 can demodulate GNSS signals from the signals received from the RF tuner 103. The GNSS system 101 also includes a CPU 107 that is configured with the ability to calculate position data, which can include position, velocity, time and/or other position related data points from signal measurements based upon the demodulated signals received by the baseband processor 105. In the context of this disclosure, signal measurements can include pseudorange measurements. Doppler measurements, raw signal measurements, or any other that can be received by the RF tuner 103 as can be appreciated. A host interface 109 is also provided in the GNSS system 101, which allows communication of data to or from the baseband processor 105 and/or the CPU 107 with the host device. In the depicted example, the host interface 109 communicates with a device interface 111 with which a host CPU 113 can likewise communicate.

The on-board CPU 107 with which the GNSS system 101 is configured can include one that exhibits low power consumption relative to traditional SoC GNSS chipsets. Accordingly, as a low power consumption CPU 107, the CPU 107 may not possess the capability to calculate position data points with the degree of accuracy and at an update rate as high as with some SoC GNSS chipsets. However, because of its lower power consumption, such a tradeoff can be desirable in the context of certain location based applications. The CPU 107 can be configured to calculate position data points using a least squares algorithm, while a SoC GNSS chipset may employ a more precise Kalman filter to calculate position data points. Employing a less precise but potentially computationally simpler algorithm to calculate position data points can allow the CPU 107 to be configured as a lower power consumption processor relative to one in a SoC GNSS that employs more computationally intensive algorithms.

The CPU 107 can also be configured to execute a certain location application without interactions with a host CPU 113. Accordingly, in some embodiments, the GNSS system 101 can be configured on on-board memory and/or mass storage (e.g., flash memory) to facilitate configuration and execution of a location application aboard the GNSS system 101 by the CPU 107. The execution of a location application by the CPU 107 is described in further detail below.

In many embodiments, the host interface 109 of the GNSS system 101 comprises a serial interface and the device interface 111 can comprise a corresponding serial interface with which the host CPU 113 can also communicate. In this way, position data points, correlation energy results, and other data can be transferred between the host CPU 113 and the various components of the GNSS system 101. The host CPU 113 can comprise a processor in a host device, such as a smartphone, navigation system device, or other device that can execute an application that uses location data provided by the GNSS system 101. For example, the host CPU 113 can comprise a main CPU of a smartphone that facilitates display of information on a smartphone display, exchange of information over various types of networks (e.g., local area networks, wide area networks, etc.), process user input (e.g., via a keyboard and/or capacitive touchscreen input device, etc.), and execute potentially many other operations, applications and processes.

The host CPU 113 can also execute a decision processor 121, which can comprise one or more commands provided by a software application programming interface (API) that can be provided to communicate with the GNSS system 101. The decision processor 121 can represent one or more API calls made by the host CPU 113 and/or an application executed by the host CPU 113 that determine a mode in which the GNSS system 101 operates, as is described in further detail below. The functionality of the decision processor 121 can also be provided within the CPU 107 of the GNSS system 101, a separate hardware processor, or any other alternative implementation as should be appreciated. The depicted implementation of a process executed by the host CPU 113 is only one example for the sake of discussion in the present disclosure.

In the context of this disclosure, a location application can include any process, service, and/or application that includes a location component. That is to say that a location application can be any application that requests position data points (e.g., latitude, longitude, velocity, etc.) that can be derived from signals received by the RF antenna system 101.

A location application can include a browser executed in a host device that requests a location of the host device. A location application can also include a geofencing application that allows a user to specify a virtual perimeter, points of interest, or other geographic markers that, when breached or approached, the application takes some action. Such an action can include generating a notification to a user or any other action as can be appreciated. A location application can also include a turn-by-turn vehicle navigation application that overlays a location of the host device onto a map that is rendered on a display associated with the host device.

Therefore, the various types of location applications can have varying requirements for location precision or accuracy as well as an update rate (e.g., frequency with which the location is updated). For example, a turn-by-turn navigation application may require very precise and/or accurate position data (e.g., with error of no more than a few meters) as well as a very high update rate so that the position of the mobile device can be tracked and overlaid on a map interface in close to real time. A geofencing application may require less precise and/or accurate position data and a less frequent update rate (e.g., once per minute) because the need to update the location of the device on a real time basis does not exist.

Accordingly, the decision processor 121 can determine a mode in which the GNSS system 101 operates depending upon the type of location application that the host device requests or requires. The decision processor 121 can also determine GNSS system 101 mode depending upon the update rate as well as precision or accuracy requested by an application requesting position data points from the GNSS system 101. When location data is not required by a location application executing in the host device, the GNSS system 101 can enter a sleep mode so that the power consumption of its various components is minimized. When location data is required, the host CPU 113 can invoke the decision processor 121 when location data is required from the GNSS system 101 by submitting a request for position data points. Such a request can be initiated by a location application by making a call to a software API or a GNSS system 101 device driver that is configured facilitate communications with the GNSS system 101.

The request to the decision processor 121 can include one or more mode parameters that describe the location precision and/or update rate requested by the location application. Depending upon the requested location precision or update rate, the decision processor 121 can cause the GNSS system 101 to enter a host mode, which wakens the RF tuner 103 and baseband processor 105, and where the host CPU 113 receives intermediate data, such as, for example, raw correlation energy data from the baseband processor 105 via the host interface 109. In such a host mode, the host CPU 113 can calculate position data points at a desired update rate from the intermediate data received from the baseband processor 105. Additionally, the decision processor 121 can transmit a command to the on-board CPU 107 to cause the CPU 107 enter or remain in a sleep or underclocked mode, which minimizes power consumption of the GNSS system 101. The decision processor 121 can invoke such a host mode when the update rate exceeds a predefined update rate threshold. In other words, if the location application requests or requires position data at a relatively high update rate, one that the CPU 107 cannot meet due to the fact that it is configured as a low power consuming processor with less capability relative to a SoC GNSS CPU, the decision processor 121 can determine that the location application is best served by the position data points being calculated by the host CPU 113 as in a host based architecture.

Additionally, if the location application requests or requires positional accuracy of the position data points used by the application to be more accurate than a predefined accuracy threshold, the decision processor 121 can also select the host mode. In other words, if the location application requests or requires position data at a relatively high accuracy, one that the CPU 107 cannot calculate due to the fact that it is configured as a low power consuming processor with less capability relative to a SoC GNSS CPU, the decision processor 121 can determine that the location application is best served by the position data points being calculated by the host CPU 113 as in a host based architecture.

Alternatively, decision processor 121 can also cause the GNSS system 101 to enter a mode in which the on-board CPU 107 calculates position data on behalf of a location application initiated in the host device and/or host CPU 113. In this scenario, the decision processor 121 can select such a mode if the update rate requested or required by the location application is less than a predefined update frequency threshold and if the accuracy requested or required by the application is also less than a predefined accuracy threshold. In other words, if the on-board CPU 107 is capable of delivering position data to meet a level of service requested by the location application, then the decision processor 121 can allow the CPU 107 to calculate the position data at the requested update rate.

Additionally, a software API provided in conjunction with the GNSS system 101 can allow a location application initiated in the host CPU 113 to be executed in the on-board CPU 107 of the GNSS system 101. In such a scenario, the host CPU 113 can enter a sleep or underclocked mode and rely on the CPU 107 to execute the location application. Accordingly, the CPU 107 can alert or wake the host CPU 113 when a particular condition is met that requires notification of the host CPU 113. For example, the CPU 107 can, for example, be configured to execute a geofencing application. The host CPU 113 can, via a software API, setup the geofence parameters as a part of a request for position data points submitted to the decision processor 121, which includes various geographical locations or markers associated with a geofence virtual perimeter. Upon setting up the geofence parameters, the host CPU 113 can enter a sleep or underclocked mode to reduce power consumption if other operations, applications or processes in the host device do not require the attention of the host CPU 113. The CPU 107 can then track a location of the device and alert the host CPU 113 when a location of the device breaches or approaches a location specified by the geofence. In other words, the CPU 107, which is a lower power processor that consumes less power than the host CPU 113, can execute the location application and wake the host CPU 113 when it is needed to perform an operation based upon a condition of the geofence parameters being met.

The request submitted by the host CPU 113 to the decision processor 121 can also include an application mode associated with a location application executed in the host device. In other words, a location application can submit a request to the decision processor 121 for a "geofencing mode," a "navigation mode," or other application modes that specify which of the CPU 107 or the host CPU 113 is to calculate position data points for the location application.

Figure 2:
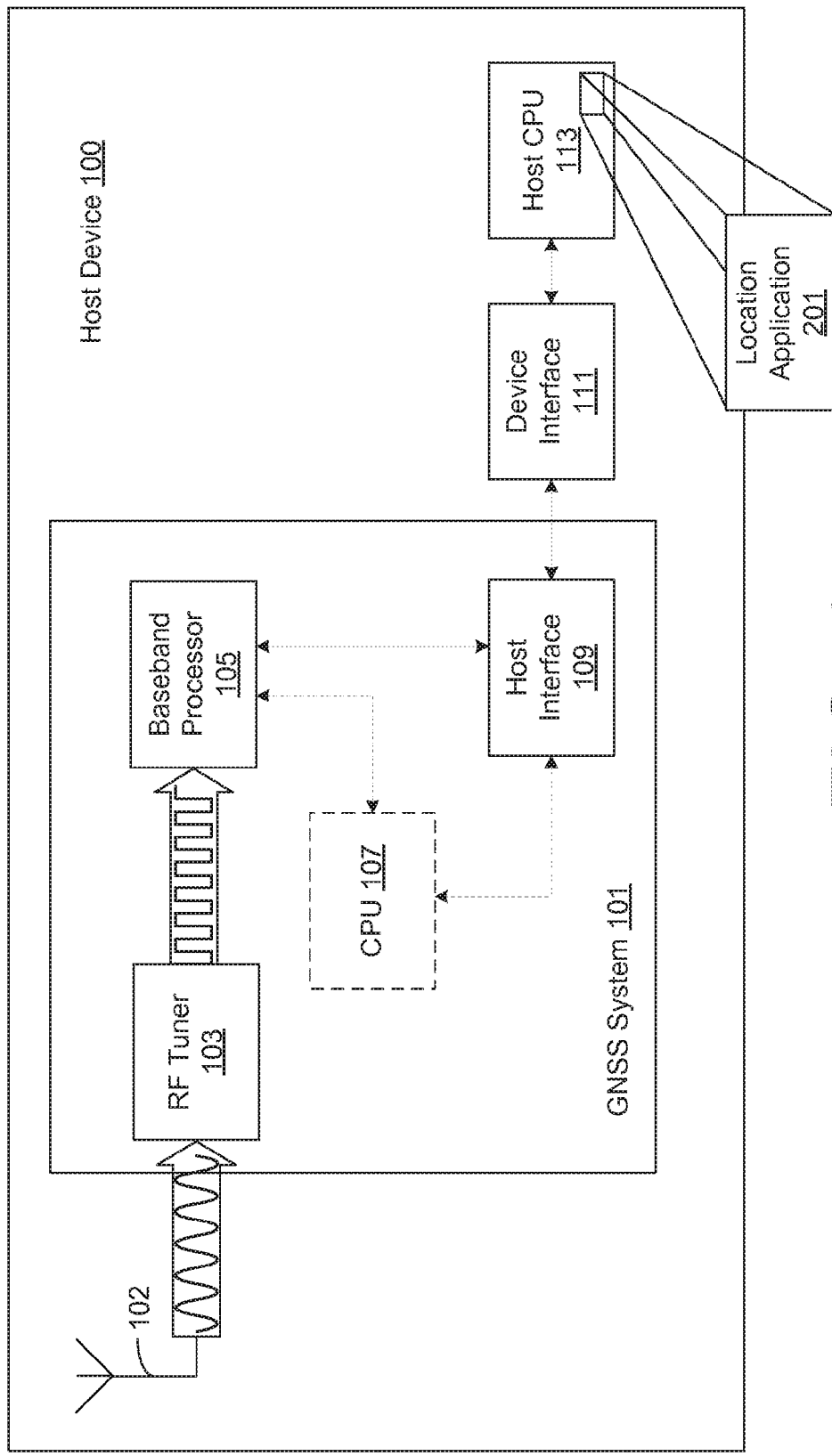
FIGS. 2-3 are drawings of the GNSS system of FIG. 1 incorporated into a host device according to various embodiments of the disclosure.

Reference is now made to FIG. 2, which illustrates an example of a GNSS system 101 in a host mode where the host CPU 113 in a host device calculates position data points based upon intermediate data provided by the baseband processor 105 of the GNSS system 101. In the depicted example, the host CPU 113 executes a location application 201 that requests or requires location data from the GNSS system 101. The decision processor 121 (FIG. 1) determines that the update rate and/or accuracy requirements of the requested location data cannot be met by the on-board CPU 107. Accordingly, the decision processor 121 places the GNSS system 101 in a host mode. In such a scenario, the on-board CPU 107 can be placed into a sleep or underclocked mode to reduce power consumption of the GNSS system 101. As noted above, the host CPU 113 can employ higher accuracy algorithm, such as a Kalman filter, to calculate position data points relative to the on-board CPU 107.

Figure 3:
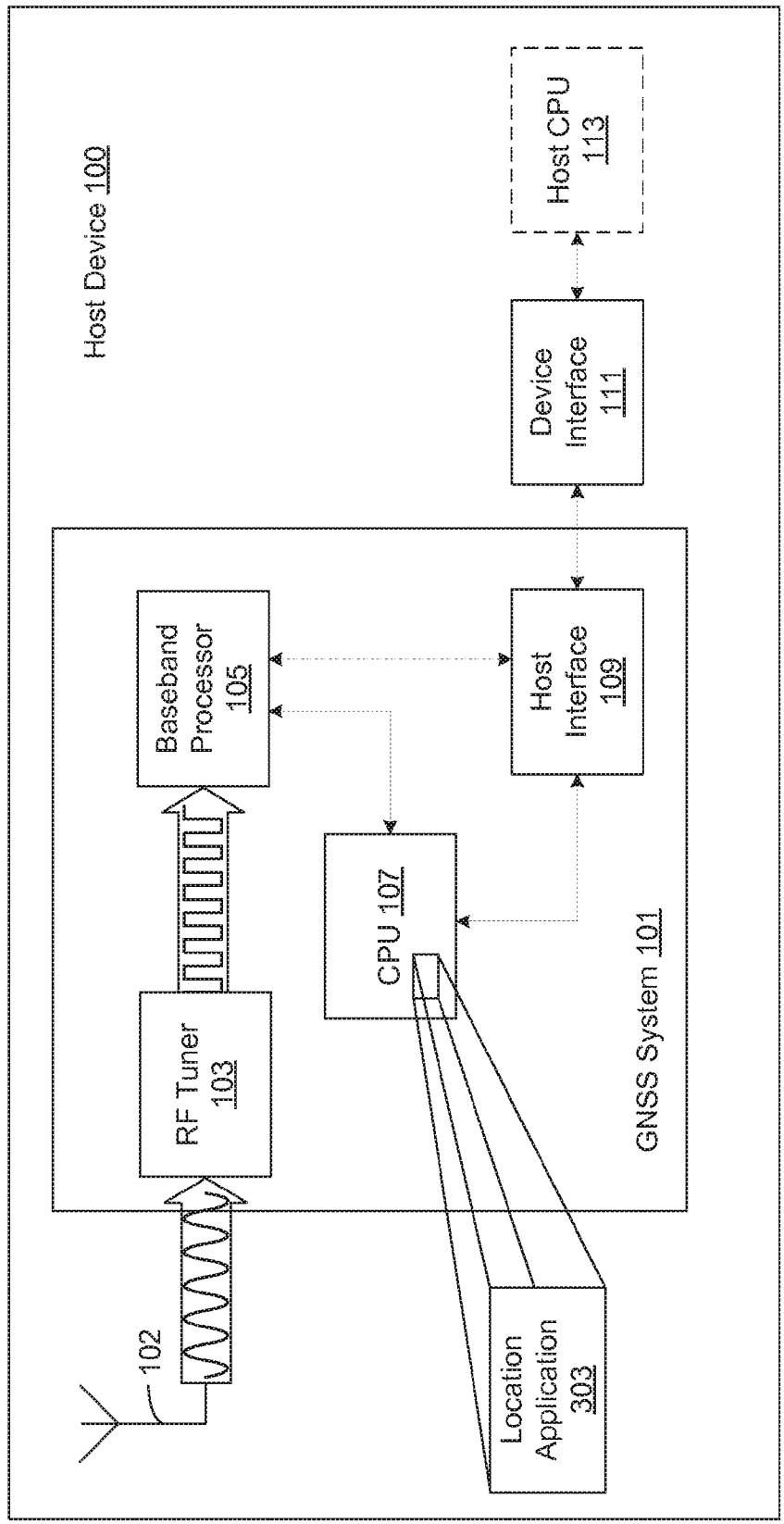

Reference is now made to FIG. 3, which illustrates an example of the GNSS system 101 in a mode where the on-board CPU 107 calculates position data based upon signal measurements received from the baseband processor 105. In the example of FIG. 3, the decision processor 121 (FIG. 1), upon receiving a request for position data from a location application in the host CPU 113, can determine whether the position data points can be calculated by the on-board CPU 107 according to the requested accuracy and/or update rate requirements. Additionally, the on-board CPU 107 can be configured to execute at least a portion of the location application 303 (e.g., location tracking related to a geofencing application) and alert the host CPU 113 when a certain condition is met. The host CPU 113 can also enter a sleep or underclocked mode until awoken by the CPU 107 when, for example, the virtual perimeter associated with a geofence is breached or is approached.

Figure 4:
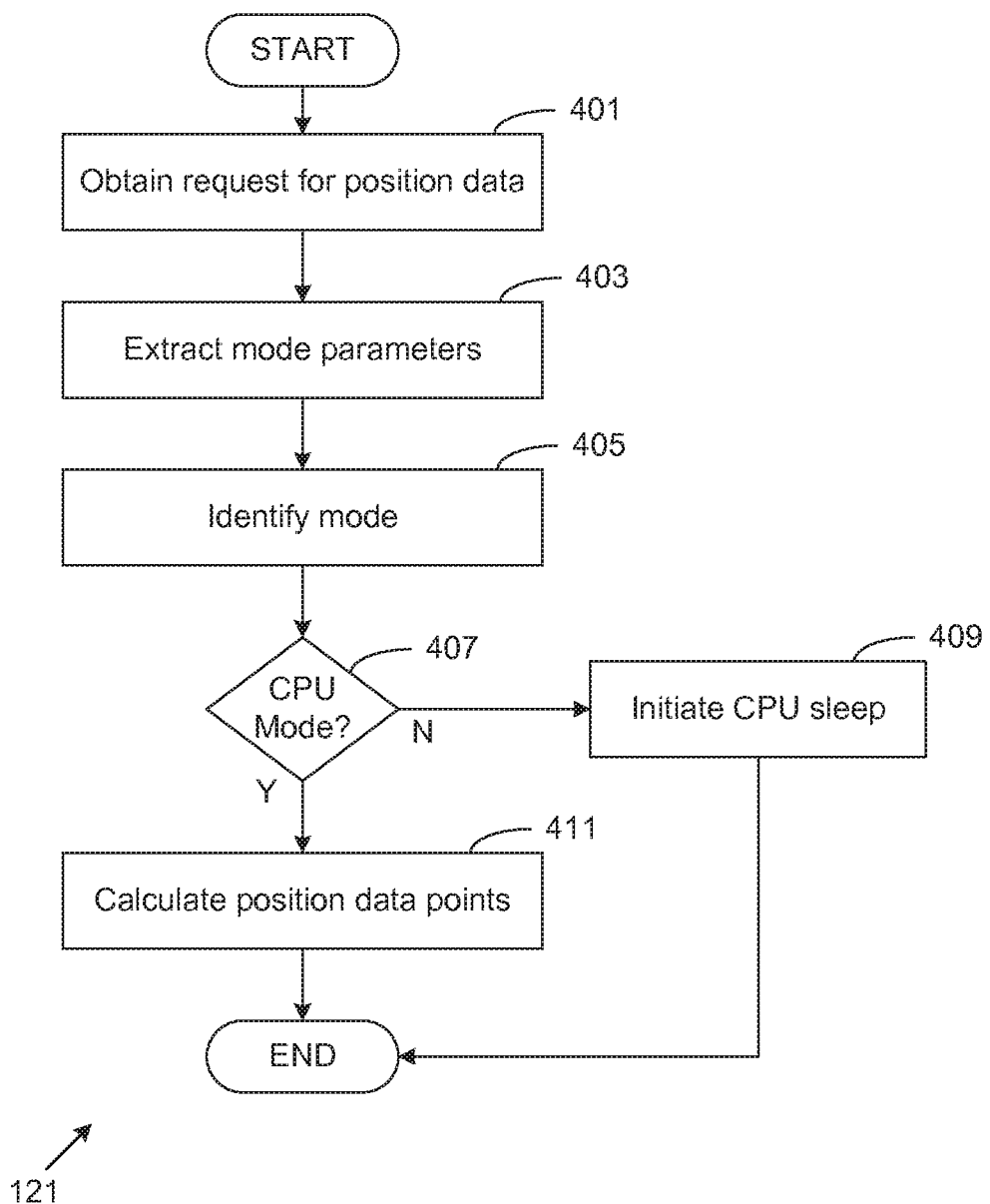
FIGS. 4-5 are flowcharts illustrating execution of the decision processor in a host device and/or GNSS system of FIG. 1 according to various embodiments of the disclosure.

Referring next to FIG. 4, shown is a flowchart that provides one example of the operation of a portion of the decision processor 121 (FIG. 1) according to various embodiments. It is understood that the flowchart of FIG. 4 provides merely an example of the many different types of functional arrangements that may be employed to implement the operation of the portion of the decision processor 121 as described herein. As an alternative, the flowchart of FIG. 4 may be viewed as depicting an example of steps of a method implemented in the CPU 107, host CPU 113, and/or any other processor or device associated with a host device 100 according to one or more embodiments.

To begin, in box 401, the decision processor 121 obtains a request for position or location data from the GNSS system 101. As noted above, the request can be initiated by a location application executed by the host CPU 113 and made via a software API provided to facilitate communication with the GNSS system 101. The request can also include various mode parameters, which can include a requested location accuracy and a requested update rate. The mode parameters can also include a parameter that defines a specific type of mode, such as a navigation mode or a geofencing mode. Such a request can also include one or more parameters that, for example, can define various geographical boundaries and/or markers associated with a geofence and/or a navigation route.

In box 403, the decision processor 121 can extract the mode parameters and identify a mode in which the GNSS system 101 can be placed in box 405. In the example of FIG. 4, the decision processor 121 can determine, based upon the mode parameters extracted from the request, whether the GNSS system should be placed in a CPU mode. In other words, the decision processor 121 can determine whether the on-board CPU 107 should calculate position data points and potentially execute a location application on behalf of the host CPU 113. If the decision processor 121 determines that the host CPU 113 will calculate position data points based upon data received from the baseband processor 105 in box 407, then the CPU 107 can be placed in a sleep or underclocked mode to reduce or eliminate its power consumption in box 409. If the decision processor 121 determines that the on-board CPU 107 can calculate position data points at an acceptable update rate based upon the mode parameters in the request, the GNSS system 101 can be placed in a corresponding mode so that the CPU 107 can calculate the position data points in box 411.

Figure 5:
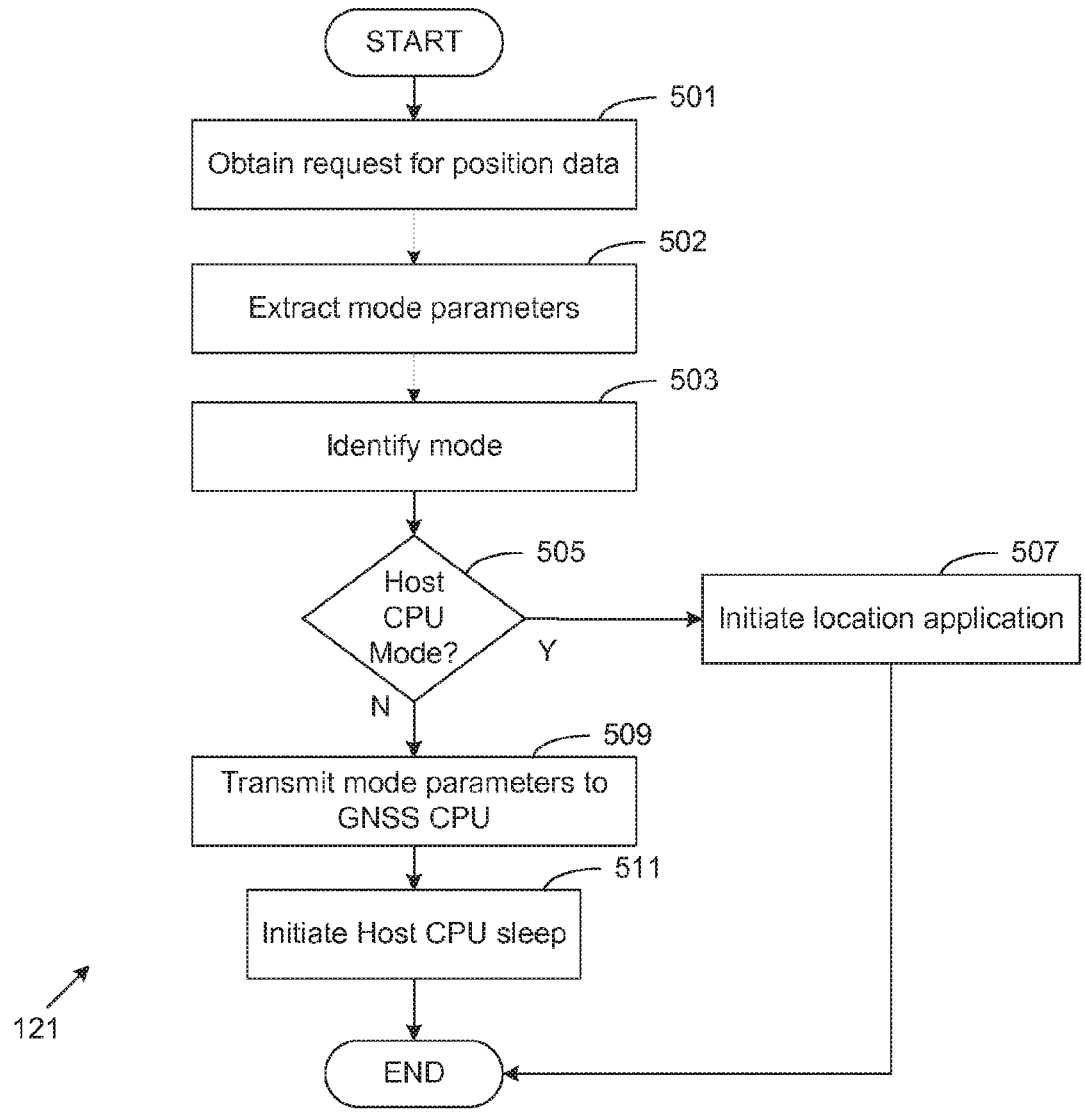

Referring next to FIG. 5, shown is a flowchart that provides one example of the operation of a portion of the decision processor 121 (FIG. 1) according to various embodiments. It is understood that the flowchart of FIG. 5 provides merely an example of the many different types of functional arrangements that may be employed to implement the operation of the portion of the decision processor 121 as described herein. As an alternative, the flowchart of FIG. 5 may be viewed as depicting an example of steps of a method implemented in the CPU 107, host CPU 113, and/or any other processor or device associated with a host device 100 according to one or more embodiments.

First, in box 501, the decision processor 121 can obtain a request for position data points from the GNSS system 101. In boxes 502 and 503, the decision processor 121 can extract the mode parameters from the request and identify a mode in which the GNSS system 101 can be placed. In box 505, if the decision processor determines that the GNSS system 101 will be placed in a host mode, then the host CPU 113 can calculate position data points in box 507 as if the GNSS system 101 is a host based architecture. In box 509, if the decision processor 121 determines that the on-board CPU 107 of the GNSS system 101 can calculate position data points as well as potentially execute a location application on behalf of the host CPU 113, then in box 509 the decision processor 121 can transmit the mode parameters to the CPU 107, which can calculate position data points according to an update rate specified by the mode parameters or an application mode specified by the request. In some embodiments, in box 511, the decision processor 121 can also initiate the host CPU 113 to enter a sleep or underclocked mode to reduce power consumption of a host device 100 in which the GNSS system 101 is integrated.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having this described the invention, at least the following is claimed:

1. A device comprising:
   circuitry configured to:
   generate data based on a signal received from a radio frequency tuner;
   selectively determine a first processor or a second processor to calculate position data from the data based on an operation mode set for the device; and
   output the data to the second processor to calculate the position data when the device is set in a second operation mode, and output the data to the first processor to calculate the position data when the device is set in a first operation mode, the second operation mode being different from the first operation mode.

2. The device of claim 1, wherein the position data includes information related to at least one of a position, a velocity, or time.

3. The device of claim 1, wherein the position data is based on a least squares algorithm.

4. The device of claim 1, wherein the second operation mode corresponds to a sleep mode.

5. The device of claim 1, wherein the device is provided in a host device that includes the second processor.

6. The device of claim 1, wherein the circuitry is configured to generate the data by demodulating the signal received from the radio frequency tuner.

7. A system comprising:
a second processor; and
a device including circuitry, the circuitry being configured to:
generate data based on a signal received from a radio frequency tuner;
selectively determine a first processor or the second processor to calculate position data from the data based on an operation mode set for the device; and
output the data to the second processor to calculate the position data when the device is set in a second operation mode, and output the data to the first processor to calculate the position data when the device is set in a first operation mode, the second operation mode being different from the first operation mode.

8. The system of claim 7, wherein the second processor is configured to calculate the position data based on the data when the device is set in the second operation mode.

9. The system of claim 8, wherein the position data that has been calculated by the second processor includes information related to at least one of a position, a velocity, or time.

10. The system of claim 7, wherein the position data includes information related to at least one of a position, a velocity, or time.

11. The system of claim 7, wherein a power consumption of the circuitry at the first operation mode is higher than a power consumption of the circuitry at the second operation mode.

12. The system of claim 7, wherein the second processor is configured to determine whether the device is set in the first operation mode or the second operation mode, and transmit a result of the determination to the device.

13. The system of claim 12, wherein the determination is based on a type of location application that the system requires.

14. The system of claim 12, wherein the determination is based on at least a precision parameter or an update rate parameter, the precision parameter being related to accuracy.

15. A device comprising:
circuitry configured to:
receive a signal from a radio frequency tuner and output data based on the received signal;
selectively determine a first processor or a second processor to calculate position data from the output data based on an operation mode set for the device; and
output the data to the second processor to calculate the position data when the device is set in a second operation mode, and output the data to the first processor to calculate the position data when the device is set in a first operation mode, the second operation mode being different from the first operation mode.

16. The device of claim 15, wherein the position data includes information related to at least one of a position, a velocity, or time.

17. The device of claim 15, wherein the position data is based on a least squares algorithm.

18. The device of claim 15, wherein a power consumption of the circuitry at the first operation mode is different from a power consumption of the circuitry at the second operation mode.

19. The device of claim 15, wherein the device is provided in a host device that includes the second processor.

20. The device of claim 15, wherein the circuitry is configured to set the first operation mode or the second operation mode based on information received from the second processor.

* * * * *